Sept. 28, 1971    H. L. RATLIFF, JR    3,608,458
WIDE-ANGLE, STEREOSCOPIC, AND FISHEYE-TYPE CAMERA FOR
SUBSTANTIALLY DISTORTION-FREE STEREOSCOPY
Filed Dec. 10, 1968    2 Sheets-Sheet 1

INVENTOR
Harvey L. Ratliff Jr.

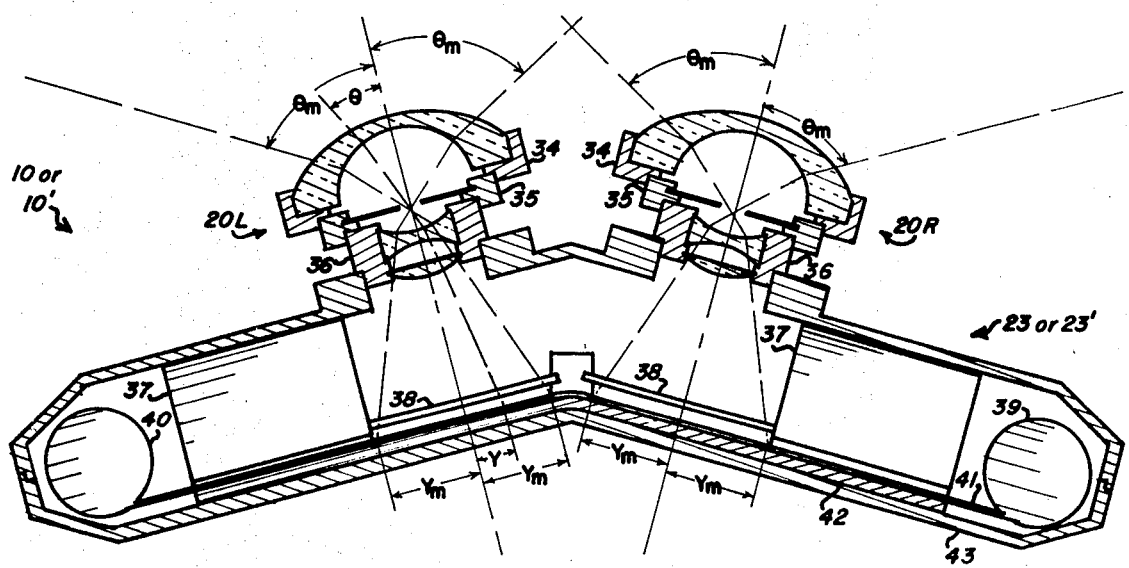
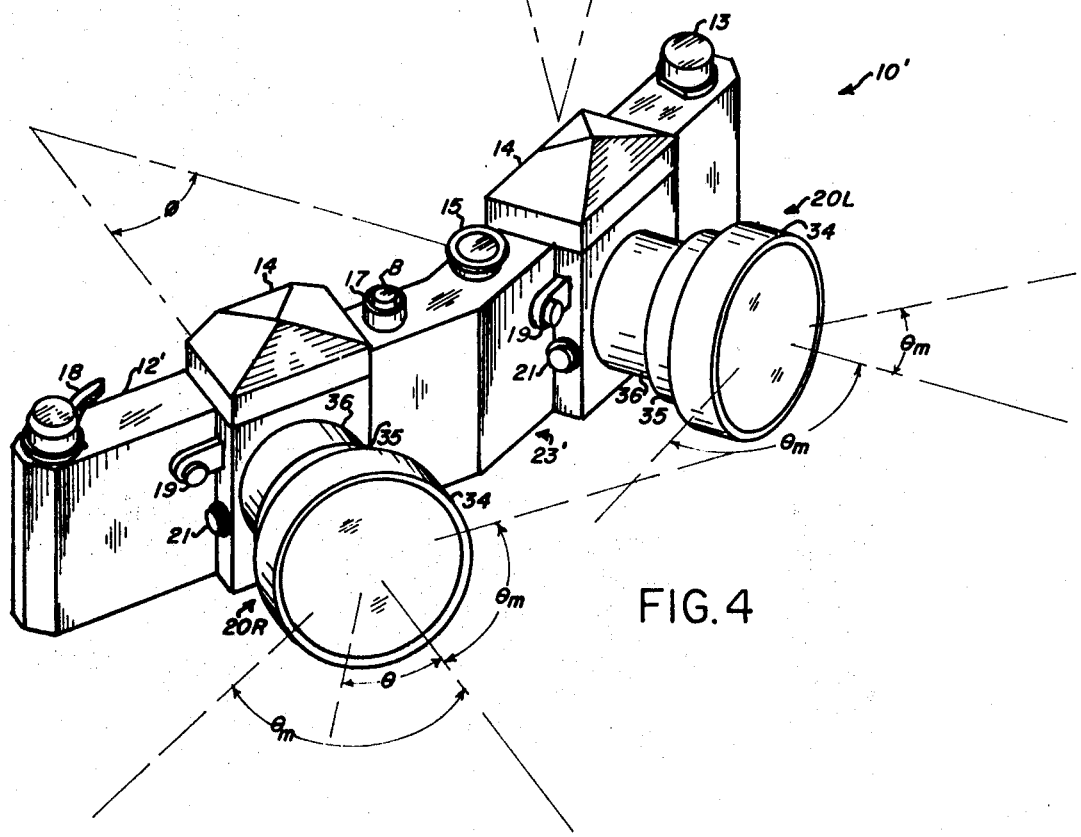

United States Patent Office 3,608,458
Patented Sept. 28, 1971

3,608,458
WIDE-ANGLE, STEREOSCOPIC, AND FISHEYE-TYPE CAMERA FOR SUBSTANTIALLY DISTORTION-FREE STEREOSCOPY
Harvey L. Ratliff, Jr., Waldorf, Md., assignor to Jetru Inc., Amarillo, Tex.
Continuation-in-part of application Ser. No. 343,841, Feb. 10, 1964. This application Dec. 10, 1968, Ser. No. 782,672
Int. Cl. G03b *35/08*
U.S. Cl. 95—18                              7 Claims

ABSTRACT OF THE DISCLOSURE

A wide-angle, stereoscopic, and fisheye-type camera for panoramic stereo re-creations utilizing fisheye lenses which preferably have diverging optical axes for taking pictures which when properly viewed enable substantially distortion-free wide-angle recreations.

CONTINUATION-IN-PART

This is a continuation-in-part of my copending prior applications S.N. 343,841, filed Feb. 10, 1964, and now U.S. Patent 3,463,570, S.N. 440,110, filed Mar. 16, 1965, and now U.S. Patent 3,504,122, and S.N. 560,531, filed June 27, 1966 and now U.S. Patent 3,424,511.

BACKGROUND OF THE INVENTION

There has been long and extensive usage of "Hill-type" or "fisheye-type" taking lenses in the prior art. These lenses were introduced in the art by Robin Hill back in 1924 and since this time there have been many different varieties of this basic type lens available. However, the prior art is devoid of beneficial utilization of these type lenses for a distortion-free and wide-angle stereoscopic system and generally holds that the "bad" barrel distortion which characterizes the pictures thereof upon direct viewing is a "major disadvantage" which renders the lenses useless unless a special effect of the barrel distortion is desired, and it has long been invisible to all the workers in the very crowded stereo and photographic art that this astigmatic-free barrel distortion of these lenses is the very key which makes possible a very practical system for wide-angle, distortion-free and astigmatic-free stereoscopy. This is true although Van Albada (in a reference cited in my U.S. Patent 3,272,069) actually taught a system for using barrel distortion to reverse the pincushion distortion of the viewing oculars back in 1924 about the same time as Hill introduced the fisheye lens; however, Van Albada gave this system (which completely overlooked the fisheye lens and used the same meniscus or "landscape" lens to take the picture as was used to view it in a way reversing the light ray paths) a general condemnation, because of astigmatism, barrel distortion and "many" other undefined reasons, that seems to have made applicant's invention totally invisible to all the many workers in the crowded stereo and photographic art except applicant for nearly a half century.

Applicant has discovered a system whereby this "major disadvantage" (fisheye-type distortion) is the very key to distortion-free and astigmatism-free wide-angle stereoscopy.

It is therefore the principal object to teach the utilization of this unobvious discovery in a new photographic camera which is unobvious because of this unobvious discovery.

SUMMARY OF THE INVENTION

With this object and others in view the invention contemplates a wide-angle, stereoscopic, distortion-free and astigmatic-free camera consisting of a camera housing supporting a pair of fisheye lenses with their optical axes making a predetermined and operative angle $\phi$ with respect to each other, means within the housing for maintaining unexposed film at the respective image planes of each of the fisheye lenses, shutter mechanism within the housing for exposing the film through the lenses, and means for activating the shutter mechanism.

DESCRIPTION OF THE DRAWINGS

FIG. 3 is a diagrammatic view showing the essential elements inside both embodiments 10 and 10' of the invention.
FIG. 4 is an isometric drawing of the other complete embodiment 10' of the invention.

DETAILED DESCRIPTION

Figure 1:
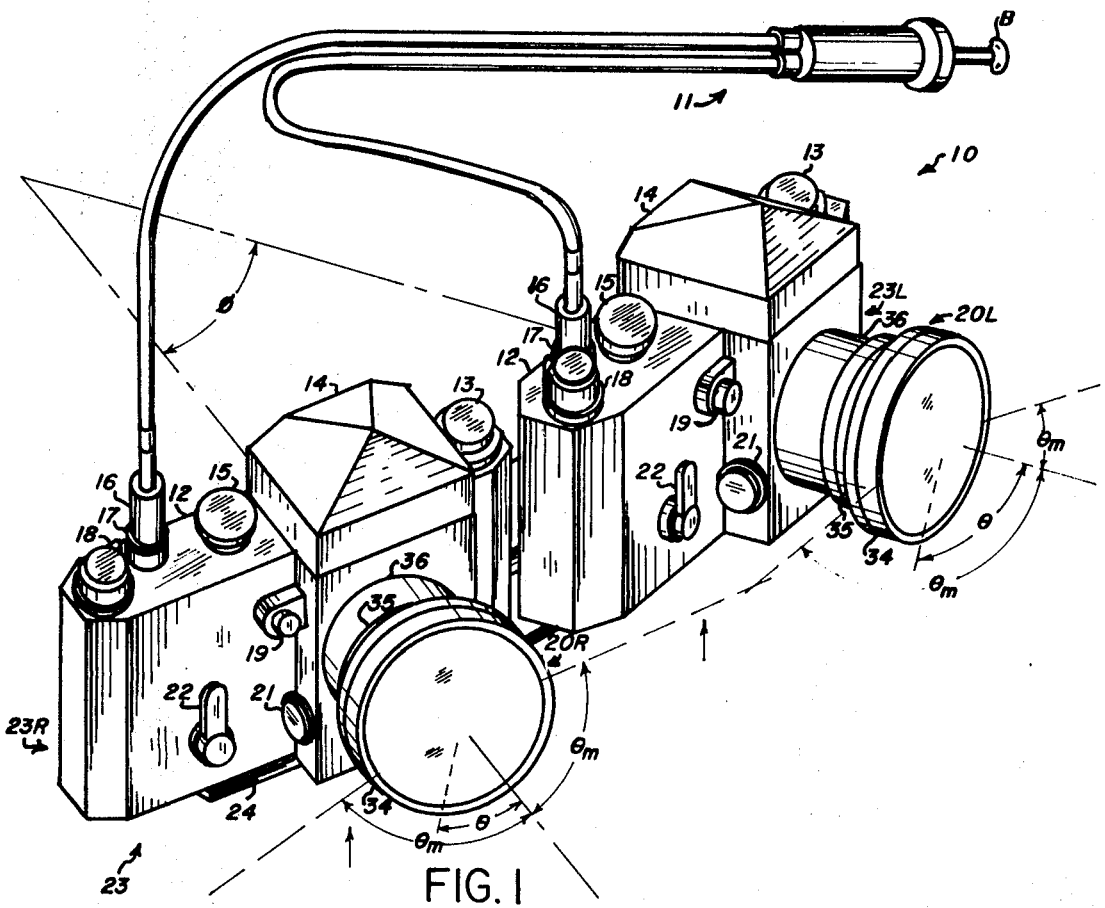
FIG. 1 is an isometric drawing of one complete embodiment 10 of the invention.
Figure 2:
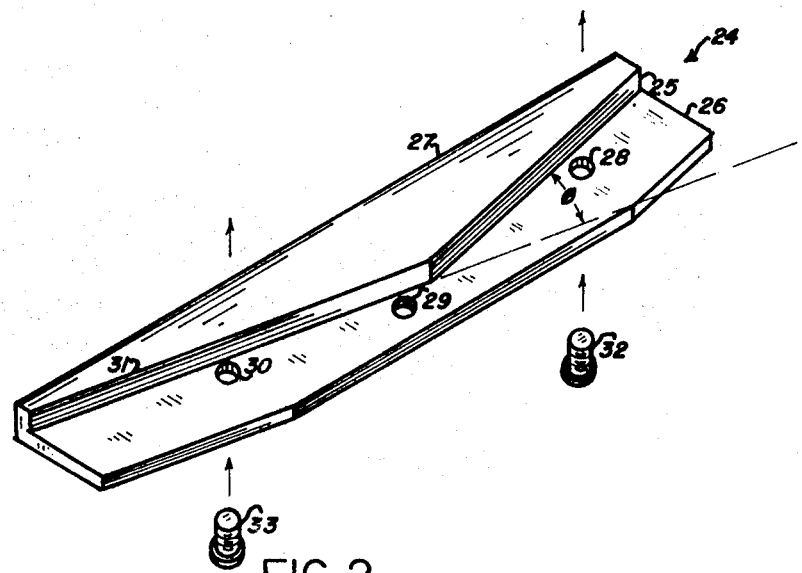
FIG. 2 is an isometric drawing of the base 24 of FIG. 1.

A more detailed description of the invention of the wide-angle, stereoscopic, fisheye-type camera 10 of FIG. 1 and 10' of FIG. 4 for substantially distortion-free stereoscopy will now be given. A pair of lenses 20L and 20R which are generally referred to as "fisheye" lenses are used. These are fashioned after (or they can actually be) the original Hill fisheye lens which Robin Hill introduced back in 1924, sometimes called a "sky lens." There are three essential elements or portions of each of these lenses 20L or 20R: a diaphragm 35, a large negative meniscus lens 34 in front of the diaphragm 35 with its optical axis passing through the center of the diaphragm 35 for compressing the entering rays from a wide angle as they enter the lens 34 to a narrow angle as they enter the diaphragm 35, and a back focusing lens 36 behind the diaphragm 35 with its optical axis in alignment with that of 34 for focusing the rays passing through 35 upon an image plane whereby the following relationship is produced:

$$K \cong \theta/Y$$

where $\theta$ is the angle an entering ray makes with the optical axis of the lens (20L or 20R) as shown in FIGS. 1, 3, and 4, Y is the perpendicular distance at the image plane from the optical axis to the point of focus of said ray, and K is a design property of the lens which remains substantially constant for values of $\theta$ between 0° and more than 42° whereby the pictures therefrom can be viewed in a viewing device such as that described in S.N. 560,531, filed June 27, 1966, to produce a distortion-free and astigmatic-free stereo re-creation for the reasons set forth in said S.N. 560,531.

There are many contemporary Hill-type fisheye lenses available today. There are the 8 mm., *f/8*, 180° "Nikon Fisheye" lens; the 12 mm., *f/5.6*, 150° "Spiratone Prime Fisheye"; the 12 mm., *f/8*, 145° "Accoura Fisheye." Each of these lenses have various sophistications of the above-described elements 35, 34, and 36. With the 8 mm. "Nikon Fisheye" the K is approximately 190°/inch to thus require an enlargement of some 5× for substantially distortion-free viewing in the device of said S.N. 560,531 to thus require film of very high resolution such as microfilm, for sharp re-creations. With the 12 mm. "Spiratone Prime Fisheye" and "Accura Fisheye" the K is approximately 112°/inch to thus require an enlargement of some 3× for substantially distortion-free viewing in the device of said S.N. 560,531 to reduce the film resolution necessary for sharp re-creations. These 12 mm. fisheye lenses can be used with a 1.5× "Telextender" (generally used to increase the focal length of a telephoto lens by a factor of 1.5, i.e. from 100 mm. to 150 mm.) to alter the back focus element 36 such as to increase their effective focal length from 12 mm. to some 18 mm. and to change the K value from some 112°/inch to some 75°/inch to thus require an enlargement of only some 2×. Also, if the diaphragm thereof is opened wide such that it has no function, virtually any standard camera lens such as the "Nikon 50 mm., f/2" lens can be used as element 36 and a special "fisheye conversion" assembly such as the "Kenko Fisheye Converter" or the "Spiratone Curvatar" can provide elements 34 and 35. Using this arrangement K can be made virtually any value desired by changing the focal length of the camera lens used as element 36, i.e. if the "Kenko Fisheye Conversion" is used with a 50 mm. lens the K is about 180°/inch but if it is used with a "Mamiya Press 150 mm." lens the K is about 75°/inch.

A housing means 23 of FIG. 1 and 23' of FIG. 4 is provided for supporting the above-described fisheye-type lenses 20L and 20R with their optical axes making a predetermined and operative angle $\phi$ with respect to each other. The value of $\phi$ depends upon the type of viewing device used to view the pictures. If the size of the ocular or Y values of the viewing device (such as the one disclosed in said S.N. 560,531) enable $\theta$ to be no greater than 42°, $\phi$ would be only 0° because divergence would tend to actually decrease the angle of view as seen by the viewing observer since the right edge of the left eye view and the left edge of the right eye view would be moved closer together to restrict the angle of view at the time they became visible to the viewer's eyes. If, on the other hand, the size and/or configuration of the ocular and the Y values of the viewing device enable $\theta$ to be as great as some 90°, $\phi$ could be some 70° because these inside edges would, even with 70° divergence, be clear out of sight; so the stero-peripheral re-creation could then be (90°+90°+70°) 250° as recorded and viewed horizontally.

To make up the housing means 23 for camera 10 of FIG. 1 a pair of standard conventional camera bodies 23L and 23R, such as for example a pair of standard "Nikon F" bodies as 23L and 23R, can be used. The above-described lenses 20L and 20R are secured into these bodies; for example: the above-described "Nikon 8 mm. Fisheye," "Spiratone 12 mm. Prime Fisheye," "Accura 12 mm. Fisheye" (with or without the "Teleconverter") or the "Kenko Fisheye Conversion" or "Spiratone Curvatar" can all be used as sold with this "Nikon F" body or with it and one of its standard lenses, or further, the original Hill lens could be specially adapted for use with this "Nikon F" body obviously when two "Nikon F" bodies are used as 23L and 23R. Further, in making up housing means 23 of FIG. 1, these bodies 23L and 23R are secured to base 24 by way of screw 32 (which has the standard tripod threads) placed up through holes 28 in thin portion 26 of base 24 to secure body 23L with its back against shoulder 25 of thick portion 27 (shoulder 25 makes an angle of $\phi$ with shoulder 31) and bottom firmly against thin portion 26 by screw 32 being then rotated in the camera threads (for a tripod) of 23L until tight; and by way of screw 33 (which also has the standard tripod threads) placed up through hole 30 in thin portion 26 to secure body 23R with its back against shoulder 31 of thick portion 27 (whereby the optical axis of 20L makes an angle of $\phi$ with the optical axis of 20R since 25 makes an angle of $\phi$ with 31) and bottom firmly against thin portion 26 by screw 33 being then rotated in the camera threads (for a tripod) of 23R until tight. For certain kinds of pictures the shutter of bodies 23L and 23R could be individually actuated by hand, for example, by pushing both shutter release buttons of the two thusly assembled "Nikon F" bodies. Preferably, however, a dual cable release 11 is used. Dual cable release mechanisms 11 are available on the market or they can be specially made. If a dual cable release 11 is used with the "Nikon F" body, an adaptor 16 is usually necessary to enable use with the shutter release 17.

It is essential that there is a means 39, 40, 42, and 43 (shown diagrammatically in FIG. 3) within the housing 23 for maintaining unexposed film 41 (shown diagrammatically in FIG. 3) at the respective image planes of each of the lenses 20L and 20R. This means (39, 40, 42, and 43) is provided by virtually any standard body 23L and 23R (such as a "Nikon F" body used as 23L and a "Nikon F" body used as 23R) and therefore need not be further described herein.

It is also essential that there is a shutter mechanism 37, 38 (shown diagrammatically in FIG. 3) within housing 23 for exposing the film 41 at the image planes of 20L and 20R. This shutter mechanism (37, 38) is provided by virtually any standard body 23L and 23R (such as a "Nikon F" body used as 23L and a "Nikon F" body used as 23R) and therefore need not be further described herein.

It is also essential that there is a means 17 for activating the shutter mechanism 37, 38. This means 17 is provided by virtually any standard body 23L and 23R (such as a "Nikon F" body used as 23L and a "Nikon F" body used as 23R) and therefore need not be further described herein.

Optionally there can be included: tripod recess 29; simultaneous shutter release 11, 16; a sophisticated film advance mechanism 18 (such as in the "Nikon F" body); a sophisticated shutter speed control mechanism 15 (such as in the "Nikon F" body); a sophisticated view finder 14 (such as in the "Nikon F" body); a sophisticated film rewinding mechanism 13 (such as in the "Nikon F" body); a depth of field preview mechanism 19, mirror locking mechanism 21, self timer mechanism 22, lens detaching mechanism and the various other sophistications of the "Nikon F" body.

To make up the housing 23' for camera 10' of FIG. 4, the two hulls 12 of FIG. 1 supported by base 24 are replaced by a single hull 12' such that said $\phi$ exists between the optical axes of 20L and 20R and the abovedescribed essential and optional elements are placed in the hull 12' in manners obvious to people having skill in the art after they have been taught the unobvious portions of the present disclosure, set forth hereinabove. There would need be only one external knob for mechanisms 18, 17, 15, or 13 rather than the two shown in FIG. 1 in the device of FIG. 4, but there could be two just exactly as shown in FIG. 1 and described therefor hereinabove with the exception that they are in one hull 12' as opposed to two hulls 12 tied together by 24, 32, and 33.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. A wide-angle, stereoscopic, and fisheye-type camera for distortion-free stereoscopy, comprising: a first camera assembly portion including a first fisheye-type lens capable of an angle of view between 84° and 190°, a first diaphragm, a first shutter mechanism; a second camera assembly portion including a second fisheye-type lens capable of an angle of view between 84° and 190°, a second diaphragm, a second shutter mechanism; a camera support stereoscopically coupling the two camera assembly portions; means for maintaining unexposed photographic film at the image planes of said lenses; means for activating both shutter mechanisms to expose the film at both image planes; each of said lenses being such that, the relationship $K \cong \theta/Y$ is produced, where $\theta$ is the angle an entering ray makes with the optical axis of the lens, Y is the perpendicular distance at the image plane from the optical axis to the point of focus of said ray, and K is a design property of the lens which is substantially constant for values of $\theta$ between 0° and 42°.

2. The device of claim 1 wherein the optical axis of said lenses intersect to make a predetermined and operative angle greater than zero, the said image planes being situated between said lenses and the point at which said optical axis intersect.

3. A wide-angle, stereoscopic, and fisheye-type camera for substantially distortion-free stereoscopy, comprising: a pair of fisheye-type lenses which each include: a diaphragm, a large negative meniscus lens in front of the diaphragm with its optical axis passing through the center of the diaphragm for compressing the entering rays from a wide angle as they enter the lens to a narrow angle as they enter the diaphragm, and back focusing lens means behind the diaphragm with its optical axis in alignment with that of the meniscus lens for focusing the rays passing through the diaphragm upon an image plane whereby the following relationship is produced:

$$K \cong \theta/Y$$

where: $\theta$ is the angle an entering ray makes with the optical axis of the lens, Y is the perpendicular distance at the image plane from the optical axis to the point of focus of said ray, and K is a design property of the lens which is substantially constant for values of $\theta$ between 0° and 42°;

housing means supporting said pair of fisheye-type lenses;
means within said housing means for maintaining unexposed film at the respective image plane of each of said fisheye-type lenses;
shutter mechanism within said housing for exposing the film at said image planes; and
means for activating the shutter mechanism.

4. The device of claim 3 wherein the optical axis of said lenses intersect to make a predetermined and operative angle $\phi$, said angle $\phi$ being greater than zero degrees, the said image planes being situated between said lenses and the point at which said optical axis intersect.

5. The device of claim 4 wherein $\phi$ is 25° and the maximum value of $\theta$ is 50°.

6. The device of claim 4 wherein $\phi$ is 70° and the maximum value of $\theta$ is 90°.

7. The device of claim 3 wherein the maximum value of $\theta$ is 42°.

References Cited
UNITED STATES PATENTS

| | | | |
|---|---|---|---|
| 2,841,063 | 7/1958 | Park | 95—18 |
| 2,955,156 | 10/1960 | Heilig | 350—133 |
| 3,524,697 | 8/1970 | Isshiki | 350—198 |
| 3,115,816 | 12/1963 | Muller | 95—12 |
| 2,036,062 | 3/1936 | Lutz | 95—18 |
| 2,804,001 | 8/1957 | Montremy | 95—18 |
| 2,953,980 | 9/1960 | Montebello | 95—18 |
| 3,045,573 | 7/1962 | Wanner | 95—18 |

SAMUEL S. MATTHEWS, Primary Examiner

D. J. CLEMENT, Assistant Examiner

U.S. Cl. X.R.

350—130